Sept. 28, 1965    R. T. INNIS ETAL    3,209,217
INSULATING SUPPORT AND CASING FOR A POWER CAPACITOR DEVICE
Filed May 29, 1963    2 Sheets-Sheet 1

WITNESSES
Theodore T. Wrobel
James T. Young

INVENTORS
Andrew S. Sweetana, Jr.
and Robert T. Innis
BY
ATTORNEY

United States Patent Office 3,209,217
Patented Sept. 28, 1965

3,209,217
INSULATING SUPPORT AND CASING FOR A POWER CAPACITOR DEVICE
Robert T. Innis, Ellettsville, and Andrew S. Sweetana, Jr., Bloomington, Ind., assignors to Westinghouse Electric Corporation, Pittsburgh, Pa., a corporation of Pennsylvania
Filed May 29, 1963, Ser. No. 284,219
9 Claims. (Cl. 317—243)

The present invention relates to power capacitor devices, and more particularly to casing and insulative support structure therefor.

In the usual power capacitor device, a plurality of elongated capacitor sections are stacked side by side, mechanically intersupported or subassembled with the desired section compression by lateral straps or the like, and electrically interconnected through conductive means so as to provide the desired capacity and voltage rating for the device. This section subassembly is disposed within a casing formed from a protectively coated metallic material or the like so that the device is provided as a unit which can withstand exposure to the weather. Further, one or more terminals are connected through leads to the capacitor sections and project through ceramic or other bushings which are sealed to the casing so as to enable the device to be connected to transmission or distribution lines for power factor correction or other purposes.

Insulative and mechanical support of the section subassembly relative to the casing is normally provided in such a manner as to meet BIL or basic impulse insulation level specifications for the device under operating conditions. In other words, the insulation must be so propertied and so arranged structurally as to withstand specified ranges of voltage gradients or stresses applied thereacross. Similarly, a special need usually arises for insulatively encompassing, such as by insulative tubes, the terminal lead or leads at least along the portion thereof located in proximity to the casing wall through which the lead or leads extend. Further, one or more discharge resistors are normally connected across the capacitor sections and encased in an insulative tube or the like both for resistor positioning and insulating purposes.

In conceptualizing a fresh approach to meeting all of the insulating and supporting requirements of capacitor sections and associated components within a capacitor device, such end objects as comparatively reduced size and compartively improved conditions in transfer of device or dielectric generated heat have primary value. Hence, although the insulating and supporting requirements can be met by respectively separate insulative members, a more efficient structural organization can be arranged so as to produce comparative advantages in insulative quality, heat transfer, production costs, device size, and other benefit measuring factors.

Thus, in accordance with the principles of the present invention, a capacitor device comprises a casing in which there are insulatively supported a plurality of elongated capacitor sections stacked side by side and suitably electrically interconnected. Insulative support means including a molded cap member and a molded base member can be disposed over respective ends of the stacked sections so as insulatively to support the latter relative to the walls of the casing. The cap member further includes molded structure arranged to provide insulating support of any terminal leads and discharge resistors or other elements provided in the capacitor device. The cap and base members are provided with walls which provide insulating coverage on the sides of the stacked sections and such walls can be tapered with diminishing thickness in the longitudinal inward direction for improved heat transfer to the casing. Cooperatively disposed and relatively thin insulative side wrapping and the walls of the cap and base members can provide the necessary side insulation within the capacitor device, or, alternately, the cap and base member side walls can be extended into mutual engagement so as substantially to encase the capacitor sections.

It is therefore, an object of the invention to provide a novel capacitor device in which there is provided efficient insulative support of the capacitor sections and other internal elements.

Another object of the invention is to provide a novel capacitor device which is provided with efficient internal insulation leading to improved heat transfer characteristics.

A further object of the invention is to provide a novel capacitor device having efficient internal insulation enabling a comparative reduction in device size.

An additional object of the invention is to provide a novel capacitor device in which one or more molded insulative members provide efficient insulating support and efficient heat transfer for capacitor sections and other elements disposed within the device.

These and other objects of the invention will become more apparent upon consideration of the following detailed description along with the attached drawings, in which.

Figures 1, 7:
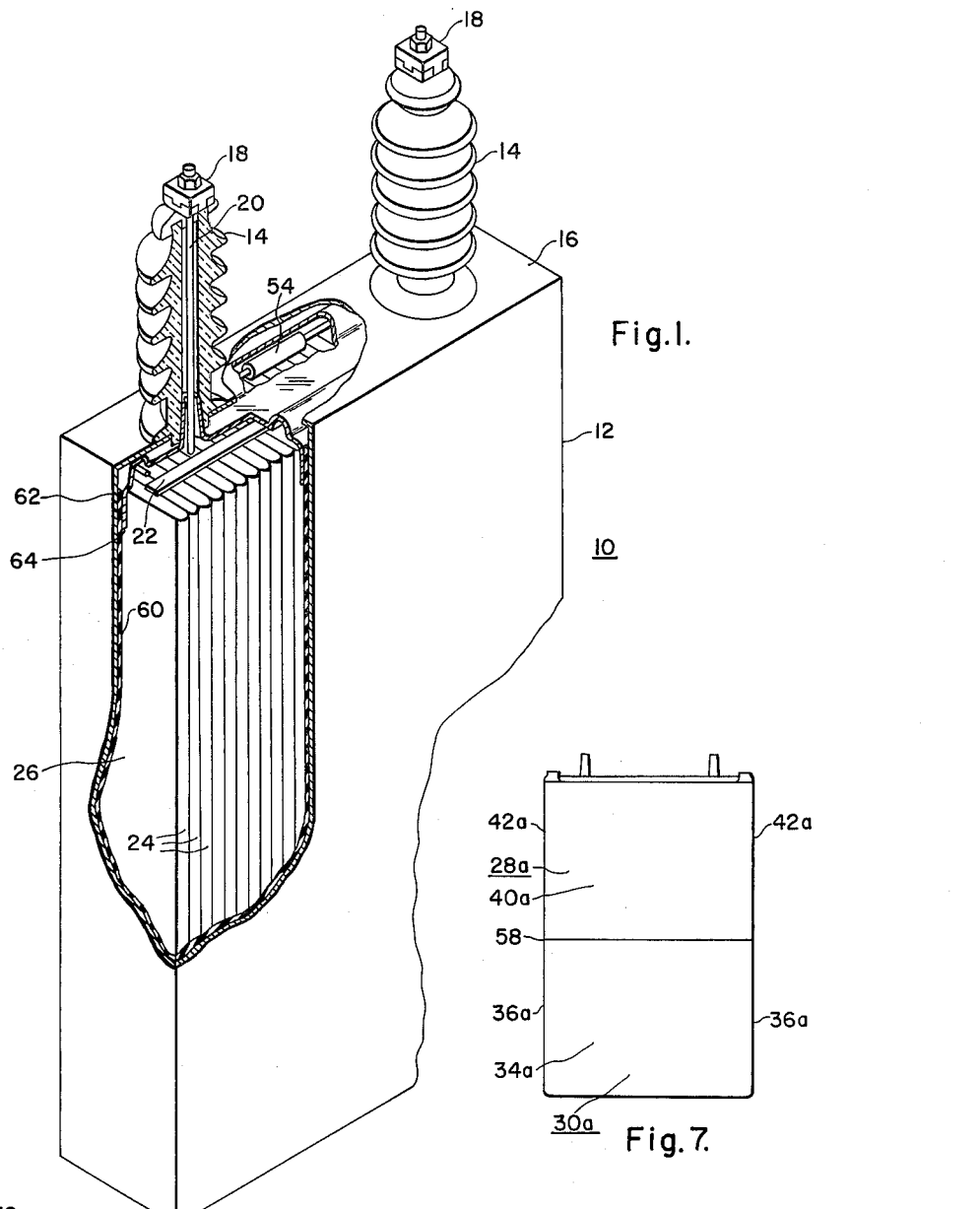
FIGURE 1 is a perspective view of a capacitor device constructed in accordance with the principles of the invention and having portions thereof broken away.
FIG. 7 is a view similar to FIG. 2 but is reduced in size and shows differently embodied cap and base members.

More specifically, there is shown in FIG. 1 a power capacitor device 10 having a protectively clad metallic casing 12 which, for reference purposes, is designated as being elongated in the vertical direction. One or more ceramic or insulative bushings 14 are supported in sealed relation on top wall 16 of the capacitor casing 12. A line connector 18 is suitably disposed on the upper and outer end of each bushing 14 and it is electrically connected to a conductive member or lead 20 extending longitudinally through the bushing 14 to the interior of the capacitor casing 12 for electrical connection by solder or other suitable means to conductive means or a terminal 22 (such as an aluminum strip) which interconnects the capacitor foils (not shown) of a plurality of capacitor sections 24 in parallel relation.

If the capacitor sections 24 are provided in the well known extended foil form, then the interconnecting strips 22 can be omitted with the extended foil serving as the interconnecting conductive means. The particular manner in which the capacitor sections 24 are interconnected depends upon design specifications and parallel, series, or series-parallel combinations can thus be employed.

The capacitor sections 24, which can each be formed in the well known manner of wrapping alternate layers (not shown) of capacitor foil (such as aluminum) and dielectric material (such as paper of suitable dielectric value), are compressed together (FIG. 2) to form an upstanding elongated unit suitable for a relatively tight fit within the capacitor casing 12. For this purpose, a relatively rigid insulative side member (not shown) can be extended along the outwardly facing side 26 of each of the outermost capacitor sections 24 and laterally extending straps (not shown) can be extended peripherally around the resulting combination to hold the capacitor sections 24 in a state of compression. However, in this embodiment of the invention, it is preferred to omit such subassembly structure or its equivalent, and to rely on insulative support means including an elongated molded insulative cap member 28 and an elongated molded insulative base member 30 or the interaction of the members 28 and 30 and the casing 12 for this purpose. For reference purposes, the longitudinal dimension of the molded members 28 and 30 is considered as extending laterally across the capacitor sections 24.

Normally the capacitor sections in a power capacitor device are immersed in a liquid dielectric such as an organic or chlorinated hydrocarbon liquid dielectric subsequent to moisture evacuation by heating or other process during the manufacturing cycle. Accordingly, the material from which the cap and base members 28 and 30 are formed preferably has chemical properties which free it from contaminating the employed liquid dielectric and further is characterized with structural and insulating properties suitable for employment in the capacitor device 10. As one example, nylon has been determined to be a suitable material in applications including those in which a chlorinated hydrocarbon is employed as the liquid dielectric.

The base member 30 comprises a bottom wall 32 and upturned side walls 34 and end walls 36 which cap the adjacent bottom end portions of the capacitor sections 24 and thereby compressively hold the bottom end portions of the capacitor sections 24 together between the end base member walls 36. As described, the base member 30 is molded to have generally a pan shape, but added structural features can be molded into or provided on the base member 30 if and as specific needs therefor arise.

The cap member 28 is similarly generally molded with a pan shape, and thus includes a top wall 38 and downwardly extending side walls 40 and end walls 42. The cap member walls 40 and 42 hold the upper end portions of the capacitor sections 24 compressively in a manner similar to that described for the base member 30.

Figure 5:
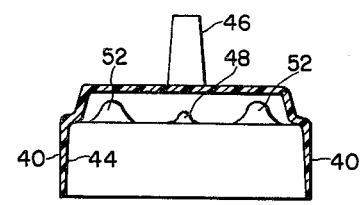
FIG. 5 is a cross-sectional view of the cap member taken along the reference line V—V of FIG. 4.
Figure 6:
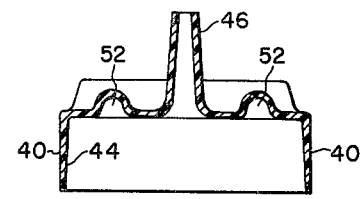
FIG. 6 is a cross-sectional view of the cap member taken along the reference line VI—VI of FIG. 4.
Figure 3:
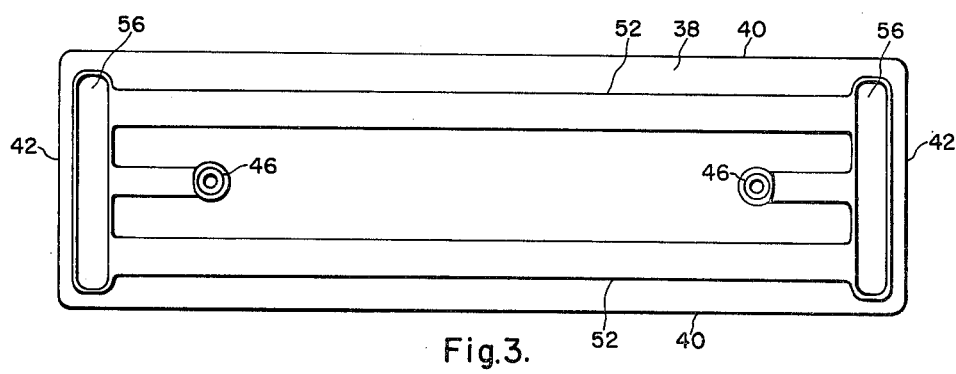
FIG. 3 is an enlarged top plan view of the molded cap member shown in FIG. 2.
Figure 4:
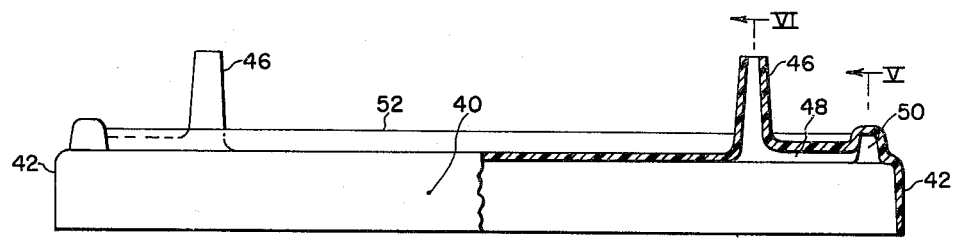
FIG. 4 is an elevational side view, partially in section, of the cap member of FIGURE 3.

It is noted generally that the thickness of the cap and base member walls 38 and 32 is established in the first instance in order to meet BIL requirements respectively of the top and bottom sides of the capacitor sections 24. The downgoing extent of the cap member side and end walls 40 and 42 is preferably made sufficient to prevent current "tracking" from exposed conductive material on top of the capacitor sections 24 to the casing 12. However, the cap member side and end walls 40 and 42 can be tapered to a thinner dimension in the downgoing direction, for example as indicated by the reference character 44 (FIGS. 5 and 6), since side BIL requirements are normally less than top BIL requirements. Similarly, the base member side and end walls 32 and 36 can be tapered in the upgoing direction if the provided bottom thickness thereof is susceptible to such tapering. Such tapered structure provides for improved transfer of device or dielectric generated heat to the side walls of the casing 12 because of the declining thermal impedance associated with the diminishing thickness dimension.

In addition, the cap member 28 is provided with a tubular member 46 extending upwardly into each bushing 14. Each tubular member 46 is integrally molded with the cap member 28 and the associated conductive member or lead 20 is extended therethrough for connection to the conductive means 22.

If desired, a channel 48 (FIG. 5) open to the top side of the capacitor sections 24 can be formed in the cap member top wall 38 so as to provide a space through which the incoming lead 20 can be extended to the conductive means 22 when the cap member top wall 38 is placed substantially flush against the top side of the capacitor sections 24. The channel 48 can further communicate with end cross channels 50 for this purpose.

The opposite end cross channels 50 can be interconnected through longitudinally extending channels 52 in either of which one or more discharge resistors 54 can be disposed when the cap member 28 is finally positioned. Other interconnecting channel structure can be employed for the purpose of wire, discharge resistor, or other element placement and insulative segregation. In some applications, for example where extended foil sections are used, it may be necessary to dispose a piece of insulative paper (not shown) or the like between the top side of the capacitor section 24 and the underside of the channel or channels in which the discharge resistor and its associated wiring are disposed.

Further, top facing shoulders 56 at each of opposite ends of the cap member 28 can be disposed for direct engagement with the inner surface of the top wall of the casing 12 so as to provide relatively rigid support and spacing of the top side of the capacitor sections 24 therefrom. However, some inherent flexibility in the employed material of the cap member 28 can provide some assurance of a relatively good fit of the capacitor sections 24 and the cap and base members 28 and 30 in the capacitor casing 12 in the vertical direction notwithstanding minor dimensional variations from unit to unit of production. A very limited amount of longitudinal or vertical compaction of the capacitor sections 24 can also serve this purpose to some extent. In this particular case, the support shoulders 56 also form the top of cross end channels 50 but it is not necessary that this be so.

Since the height of the space between the top side of the capacitor sections 24 and the inner surface of the top wall of the casing 12 is only that which is necessitated by the thickness of the cap member top wall 38 and the height needed for the employed channel structure, a material economy in overall device height is provided. Thus, as compared, for example, to capacitor devices where side insulative wrapping is folded over to provide the necessary amount of top insulation and where discharge resistors disposed in elongated insulative tubes are disposed above or below such top insulating folds, as much as one-half to one inch of casing height can be eliminated with employment of the cap member 28.

Figure 2:
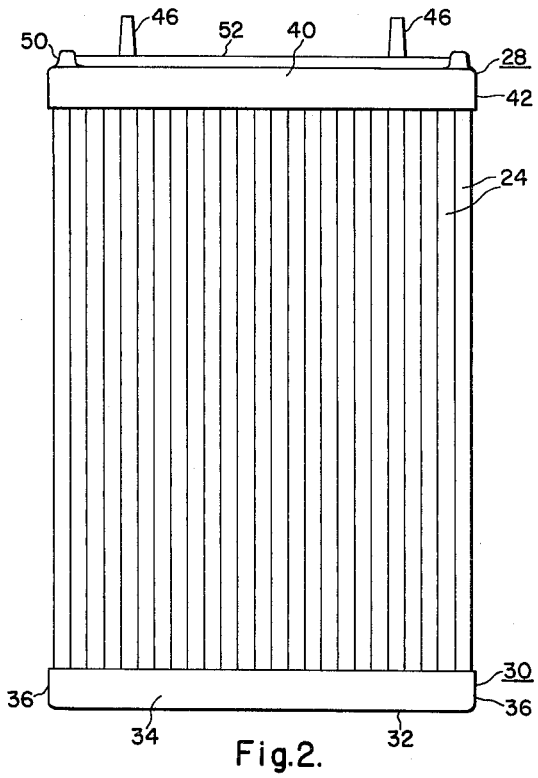
FIG. 2 is an elevational side view of a plurality of vertically elongated capacitor sections with molded cap and base members supported thereon and forming a part of the capacitor device of FIG. 1.

It is noted that the cap member walls 40 and 42 and the base member walls 34 and 36 can be extended toward each other along the vertical dimension of the capacitor sections 24 to an extent considerably greater than that observed in FIG. 2. Thus, cap and base member walls 40a, 42a and 34a, 36a can be extended toward each other to meet or mutually engage for example, at approximately the midpoint of the height of the capacitor sections 24 as indicated by the reference character 58 (FIG. 7). Cap member 28a and base member 30a then form a total insulative enclosure for the capacitor sections 24 and the need for all other insulative support and separating material can thereby be eliminated. In such an embodiment, the cap and base member walls 40a, 42a and 34a, 36a can be tapered in a manner similar to that previously indicated by the reference character 44. Section subassembly straps or the like can also be eliminated and considerable benefits in heat transfer are obtained.

On the other hand, with employment of the cap member 28 and the base member 30, the aforementioned insulative support means include a side insulative member or wrapping 60 (FIG. 1) which can be disposed in one or more layers about the sides of the capacitor sections 24. Preferably, the upper and lower ends of the insulative wrapping 60 are disposed about and overlap the outer sides of the cap and base member walls 40, 42 and 34, 36 particularly in order to provide a longer "tracking"

path which terminates at the upper end of the insulative side wrapping 60 as indicated by the reference character 62 rather than at the lower end of the cap member walls 40 and 42 as indicated by the reference character 64.

When the capacitor sections 24 are wrapped with the side wrapping 60 in the manner described, the entire combination can then be disposed within the capacitor casing 12 and the resulting compression of the capacitor sections 24 between the outer sides 26 thereof is sufficiently controlled to provide a compact unit of desired capacity. In addition, lateral subassembly straps or the like and the added thermal impedance introduced thereby can therefore be eliminated and heat transfer benefits are accordingly obtained in this embodiment as in the previously described embodiment where the cap and base members 28 and 30 form a total enclosure. However, even if lateral subassembly straps or the like are employed, heat transfer benefits are obtained since the total amount of thickness of the side wrapping 60 is determined by the BIL requirements of the capacitor sides rather than by the BIL requirements of the capacitor top as would be the case where the side wrapping is folded over to provide the necessary top insulation. Thus, in the comparative example just cited, a capacitor device normally requiring 80 mils of top and side insulative wrapping thickness can be provided with the side wrapping 60 having a thickness of 50 or less mils when the wrapping 60 is used in combination with the cap member 28.

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:

1. A capacitor device comprising a plurality of elongated capacitor sections stacked in side by side relation, insulative support means for said sections including molded cap and base members having respective top and bottom wall portions respectively disposed against the opposite ends of said sections, said cap and base members having respective side and end walls extending from said cap and base member top and bottom wall portions along outer side surfaces of said sections so as compressively to hold said sections together, at least said cap member side and end walls tapered with diminishing thickness in the extending direction thereof, a casing in which said sections and said insulative support means are disposed, and terminal means connected to said sections through said cap member.

2. A capacitor device comprising a plurality of elongated capacitor sections stacked in side by side relation, molded insulative cap and base members having respective top and bottom wall portions respectively disposed against the opposite ends of said sections, said cap and base members having respective side and end walls extending from said cap and base member top and bottom wall portions along outer side surfaces of said sections so as compressively to hold said sections together, insulative wrapping disposed about the lateral peripheral area of said sections and the outer sides of said cap and base member side and end walls, a casing in which said sections and said cap and base members and said insulative wrapping are disposed, and terminal means connected to said sections through said cap member.

3. A capacitor device comprising a plurality of elongated capacitor sections stacked in side by side relation, molded insulative cap and base members having respective top and bottom wall portions respectively disposed against the opposite ends of said sections, said cap and base members having respective side and end walls extending from said cap and base member top and bottom wall portions along the outer side surfaces of said sections into mutual engagement so as to provide substantially total insulative encasement for said sections and so as compressively to hold said sections together, said side and end walls of at least said cap member tapered with diminishing thickness in the extending direction thereof, a casing in which said sections and cap and base members are disposed, and terminal means connected to said sections through said cap member.

4. A capacitor device comprising a plurality of elongated capacitor sections stacked in side by side relation, insulative support means for said section including a molded cap member having a top wall portion disposed on one end of said sections and having respective side and end walls extending from said cap member top wall portion along outer side surfaces of said sections so as compressively to hold said sections together, at least one channel disposed in said cap member top wall portion and being open to the adjacent end of said sections, discharge resistance means connected across at least some of said sections and disposed in said cap member channel, a casing in which said sections and said insulative support means are disposed, and terminal means connected to said sections through said cap member.

5. A capacitor device comprising a plurality of elongated capacitor sections stacked in side by side relation, a molded insulative cap member having a top wall portion disposed on one end of said sections and having respective side and end walls extending from said cap member top wall portion along outer side surfaces of said sections so as compressively to hold said sections together, insulative means having a portion thereof disposed about the lateral periphery of said sections so as to provide additional compressive holding force on said sections, a casing in which said sections and said cap member and said insulative means are disposed, and terminal means connected to said sections through said cap member.

6. A capacitor device comprising a plurality of elongated capacitor sections stacked in side by side relation, insulative support means for said sections including a molded cap member having a top wall portion disposed on one end of said sections and having respective side and end walls extending from said cap member top wall portion along outer side surfaces of said sections so as compressively to hold said sections together, a casing in which said sections and said insulative support means are disposed, a bushing disposed on said casing, said cap member top wall portion having at least one integral tubular portion extending outwardly from said sections, and terminal means connected to said sections through said bushing and said cap member tubular portion.

7. A capacitor device comprising a plurality of elongated capacitor sections stacked in side by side relation, insulative support means for said sections including a molded cap member having a top wall portion disposed on one end of said sections and having respective side and end walls extending from said cap member top wall portion along outer side surfaces of said sections so as compressively to hold said sections together, a casing in which said sections and said insulative support means are disposed, a bushing disposed on said casing, said cap member top wall portion having at least one integral tubular portion extending outwardly from said sections into said insulative bushing, at least one channel disposed in said cap member top wall portion and being open to the adjacent end of said sections, discharge resistance means connected across at least some of said sections and disposed in said cap member channel, and terminal means connected to said sections through said bushing and said cap member tubular portion.

8. A capacitor device comprising a plurality of elongated capacitor sections stacked in side by side relation, insulative support means for said sections including molded cap and base members having respective top and bottom wall portions respectively disposed against the opposite ends of said sections, said cap and base members having respective side and end walls extending from said cap and base member top and bottom wall portions along the outer side surfaces of said sections so as compressively to hold said sections together, a casing in which said sections and said insulative support means are disposed, a bushing disposed on said casing, said cap member top wall portion having at least one integral tubular portion extending outwardly from said sections, and terminal means connected to said sections through said bushing and said cap member tubular portion.

9. A capacitor device comprising a plurality of elongated capacitor sections stacked in side by side relation, molded insulative cap and base members having respective top and bottom wall portions respectively disposed against the opposite ends of said sections, said cap and base members having respective side and end walls extending from said cap and base member top and bottom wall portions along outer side surfaces of said sections so as compressively to hold said sections together, insulative wrapping disposed about the lateral peripheral area of said sections and the outer sides of said cap and base member side and end walls, a casing in which said sections and said cap and base members and said insulative wrapping are disposed, a bushing disposed on said casing, said cap member top wall portion having at least one integral tubular portion extending outwardly from said sections, at least one channel disposed in said cap member top wall portion and being open to the adjacent end of said sections, discharge resistance means connected across at least some of said sections and disposed in said cap member channel, and terminal means connected to said sections through said bushing and said cap member tubular portion.

References Cited by the Examiner

UNITED STATES PATENTS

| | | | |
|---|---|---|---|
| 2,160,646 | 5/39 | Coutlee | 317—242 |
| 2,986,680 | 5/61 | Odell | 317—242 |
| 3,018,427 | 1/62 | Marbury | 317—242 |

JOHN F. BURNS, *Primary Examiner.*

LARAMIE E. ASKIN, *Examiner.*